Patented Aug. 30, 1949

2,480,297

UNITED STATES PATENT OFFICE 2,480,297

PHOSPHORUS SULFIDE TREATED ETHYLENE POLYMER COMPOSITION

Richard Morgan Goldrick, Arlington, and Barnard Mitchel Marks, Newark, N. J., assignors to E. I. du Pont de Nemours & Company, Wilmington, Del., a corporation of Delaware No Drawing. Application February 18, 1947, Serial No. 729,416

3 Claims. (Cl. 260—79.5)

This invention relates to polymer compositions and, more particularly, to ethylene polymer compositions adapted to give products of improved transparency and surface characteristics.

The polymers of ethylene which are solids at normal temperatures, are disclosed and claimed in Fawcett et al. U. S. Patent 2,153,553 and are now known as polythene. These polymers are tough solids at normal temperatures with a softening point from about 212° F. to 250° F., corresponding in composition substantially to $(CH_2)_x$, and show a crystalline structure by X-ray diffraction analysis. Generally, they have average molecular weights in excess of six thousand measured according to the method described in the aforementioned patent.

Polythene possesses inherently outstanding properties for use in many applications such as electrical insulation, impregnating, coating and laminating, molded articles and extruded films and filaments. Particularly, in the packaging field thin transparent forms of polythene have been found very useful. Polythene films in thin sections may be obtained in a more or less transparent state by suitable control of either solution casting or melt extruding operations but these processes are tedious when applied on a commercial scale.

An object of the present invention is to provide new polythene compositions. Another object is to provide polythene compositions adapted to give products of improved transparency and surface characteristics. A further object is to provide a process of forming polythene sheets and filaments of improved transparency and surface characteristics. Other objects will be apparent from the description of the invention given hereinafter.

The above objects are accomplished according to the present invention by providing a composition essentially comprising polythene and, as a modifier therefor, 0.01% to 1.0%, by weight of the polythene, of sulfur or a sulfide of phosphorus. The invention also comprises forming a sheet or filament by extruding a composition as above at a temperature above approximately 300° F. and, preferably, between 300° F. and 500° F.

The composition of this invention may be prepared by uniformly blending the polythene with the sulfur or the sulfide of phosphorus in the proportions above indicated. The blending of the components of the composition may be conveniently carried out by mixing on a rubber mill, in a Banbury mixer, in a plasticator, or in other conventional apparatus used to compound plastics. The blending may be done either with or without a solvent, the solvent being subsequently evaporated when used. It is preferred that the mixing be carried out at a temperature slightly above the softening point of the polymer.

After the composition has been formed it may be reduced to a suitable particle size by comminution in a Ball and Jewell cutter or like apparatus and the comminuted composition may then be fed to an extruding machine for extrusion under conventional conditions but at a temperature above approximately 300° F. and, preferably, in the range of 300° F. to 500° F. although higher temperatures up to 600° F. or so may be used advantageously in some instances.

The improvement in clarity and reduction in surface imperfections is most noticeable in extruded film of thicknesses less than 0.015 in. To obtain maximum clarity the film as it issues from the extruder head should be quenched. This may advantageously be carried out by passing the hot film, extruded at a temperature above 300° F., directly into a non-solvent cooling liquid, such as water, maintained at 50° F. to 120° F. However, improvement in the surface smoothness and freedom from surface defects is noticeable in films of other thicknesses, monofilaments and the like extruded from the compositions of this invention. The following example in which all parts are by weight unless otherwise specified, more fully illustrates the nature of the invention.

EXAMPLE

Several identical samples of polythene (each consisting of 100 parts) taken from the same batch, were rolled on a rubber mill at 235° F. and small amounts of the modifiers listed in the table were added. Each mixture was rolled for ten minutes and then removed from the rolls in the form of slabs which were reduced to small particles in a Ball and Jewell cutter. Each composition was then extruded at approximately 392° F. into films varying in thickness from 0.001" to 0.015" and quenched directly upon extrusion in a 65° F. water bath. Samples of unmodified polythene were also extruded under identical conditions in the same thicknesses to serve as controls for comparison with the modified samples.

When films of samples A through E (table) were compared with films of the same thickness of sample F (unmodified polythene), the modified films in each case exhibited a definitely smoother surface and greater transparency than the films made from sample F.

*Table 1*

| Sample | Modifier | Parts of Modifier per 100 parts of Polythene |
|---|---|---|
| A | Phosphorus pentasulfide ($P_2S_5$) | 0.01 |
| B | Phosphorus pentasulfide | 0.04 |
| C | ....do.... | 0.16 |
| D | Phosphorus trisulfide ($P_2S_3$) | 0.04 |
| E | Sulfur | 0.03 |
| F | None | |

It will be understood that the above example is merely illustrative and that the invention broadly comprises new compositions of polythene containing, as a modifier therefor, 0.01% to 1.0%, by weight of the polythene, of at least one material from the group consisting of sulfur and sulfides of phosphorus.

The modifiers useful in the present invention are sulfur and the sulfides of phosphorus including $P_2S_5$, $P_2S_3$, and $P_4S_3$. The mode of action of these modifiers in the herein considered polythene compositions has not been definitely established but it is believed that a reaction takes place between the modifier and the polythene, said reaction only taking place when the temperature of the composition reaches a certain point, to form —SH groups on the polythene chain. In any event, it has been found that, when used with polythene in the proportions disclosed, these modifiers do have the definite effect of substantially increasing the clarity of polythene extruded in thin sections, provided the temperature of the composition is raised to at least approximately 300° F. either during the blending of the components or during the extrusion of the composition or at some other time prior to the extrusion.

As it usually is advantageous to extrude polythene compositions at a temperature above 300° F. for other reasons, the heating of the composition to above 300° F. is preferably done during the extrusion step. However, there is no reason why the temperature should not be raised above 300° F. during both the blending and extrusion steps or only during the blending step so far as obtaining the clarifying effect in the extruded film is concerned. Because of this observation with respect to the clarifying effect of these modifiers above 300° F. and the further fact that the clarifying effect is appreciably more noticeable in films having a thickness of less than .015", a preferred form of the invention comprises the process of extruding the herein compositions at a temperature above 300° F. in the form of films having a thickness of less than .015". Preferably, the extrusion temperature will not exceed 500° F. although higher temperatures running up to 600° F. and even above may be used satisfactorily in most instances. It should be understood, however, that the instant compositions are of value in extruding films of greater thicknesses and monofilaments in that the extruded product has an improved surface, i. e., smoother and free of defects, even though the improvement in clarity in such products may not be so noticeable.

The proportion of modifier should be kept within the range of 0.01% to 1.0% by weight of the polythene. At least 0.01% of modifier must be used to gain substantial benefit from the present invention and it is preferred to use between 0.02% and 0.2% in order to gain maximum improvement. It is not advisable to use in excess of 1% of modifier, by weight of the polythene, not only because no further improvement in clarity or freedom from surface defects is obtained but various disadvantages are encountered including the danger of causing a certain amount of discoloration in the product.

In addition to the group of sulfur and sulfides of phosphorus, two other groups of modifiers have been found to be more or less equivalent when employed in the proportion of less than 1% by weight of the polythene. One group consists of certain organic sulfides, examples of which are benzothiazyl disulfide, dipentamethylenethiuram - tetrasulfide, tetramethyl - thiurammonosulfide, tetramethyl - thiuram - disulfide, tetraethyl-thiuram-disulfide, and the condensation product of hexamethylene tetramine with benzyl chloride and 2-mercaptobenzothiazole. The second group consists of organic compounds containing one or more —SH groups, the preferred examples of which are aliphatic mercaptans having from 12 to 24 carbon atoms, e. g. 1-dodecanethiol and 1-octadecanethiol; thio betanaphthol; and 2-mercaptobenzothiazole.

Minor amounts of other additives may be incorporated in the modified polythene compositions of this invention provided the additional ingredients are present in amounts of less than about 15% by weight of the polymer and provided they are relatively chemically inert under the conditions to which the composition will be exposed in extruding or other forming operation. Also, additives which impair the clarity of the resulting compositions, obviously should be avoided where clarity is an essential requisite. Thus, small amounts of antioxidants may be employed in amounts varying from 0.1% to 2% by weight of the polythene; also, small amounts of dyes and lubricants may be added. Pigments and fillers can be employed where the compositions are not intended for use in the manufacture of transparent products.

As many apparently widely different embodiments of this invention may be made without departing from the spirit and scope thereof, it is to be understood that the invention is not limited to the specific embodiments thereof except as defined in the appended claims.

The invention claimed is:

1. Solid polythene having had 0.01% to 1.0%, by weight of said polythene, of a sulfide of phosphorus uniformly distributed therein and having thereafter been subjected to a temperature of at least 300° F.

2. Solid polythene having had 0.02%–0.2%, by weight of said polythene, of a sulfide of phosphorus uniformly distributed therein and having thereafter been subjected to a temperature of at least 300° F.

3. A transparent film less than .015 inch thick of solid polythene as recited in claim 1.

RICHARD MORGAN GOLDRICK.
BARNARD MITCHEL MARKS.

(References on following page)

REFERENCES CITED

The following references are of record in the file of this patent:

UNITED STATES PATENTS

| Number | Name | Date |
|---|---|---|
| 2,219,700 | Perrin et al. | Oct. 29, 1940 |
| 2,364,435 | Foster et al. | Dec. 5, 1944 |

FOREIGN PATENTS

| Number | Country | Date |
|---|---|---|
| 540,049 | Great Britain | Oct. 3, 1941 |

OTHER REFERENCES

Hahn et al.: Ind. & Engr. Chem., vol. 37, pp. 528–533 (June 1945).

Richards: British Plastics (Apr. 1945), pp. 146–151.